(12) United States Patent
Hall

(10) Patent No.: US 9,946,490 B2
(45) Date of Patent: Apr. 17, 2018

(54) BIT-LEVEL INDIRECTION DEFRAGMENTATION

(71) Applicant: HGST Netherlands B.V., Amsterdam (NL)

(72) Inventor: David Robison Hall, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 137 days.

(21) Appl. No.: 15/222,504

(22) Filed: Jul. 28, 2016

(65) Prior Publication Data

US 2018/0032278 A1     Feb. 1, 2018

(51) Int. Cl.
*G06F 3/06*     (2006.01)
*G06F 12/10*    (2016.01)
*G06F 12/1009*  (2016.01)

(52) U.S. Cl.
CPC .......... *G06F 3/0647* (2013.01); *G06F 3/0608* (2013.01); *G06F 3/0685* (2013.01); *G06F 12/1009* (2013.01); *G06F 2212/1044* (2013.01)

(58) Field of Classification Search
CPC .. G06F 3/0647; G06F 3/0685; G06F 12/1009; G06F 3/0608; G06F 2212/1044
See application file for complete search history.

(56) References Cited

U.S. PATENT DOCUMENTS

| | | | |
|---|---|---|---|
| 8,559,121 B2 | 10/2013 | Saito et al. | |
| 8,683,145 B2 | 3/2014 | Obr et al. | |
| 8,819,375 B1 | 8/2014 | Pruett et al. | |
| 8,909,859 B2 | 12/2014 | Bandic et al. | |
| 8,966,207 B1 | 2/2015 | Bushman | |
| 2013/0326117 A1* | 12/2013 | Aune | G06F 3/0608 711/103 |
| 2014/0195725 A1* | 7/2014 | Bennett | G06F 12/0246 711/103 |
| 2015/0160882 A1 | 6/2015 | Coker et al. | |
| 2017/0277471 A1* | 9/2017 | Huang | G06F 3/0619 |

OTHER PUBLICATIONS

SMR Layout Optimisation for XFS (v0.2, Mar. 2015), 7 pgs.

* cited by examiner

*Primary Examiner* — Zhou Li
(74) *Attorney, Agent, or Firm* — Foley & Lardner LLP

(57) ABSTRACT

In general, techniques are described for logical defragmenting of a storage device. A controller of a storage device groups sequential logical block addresses of a logical span into a plurality of groups. Each group includes a same number of logical block addresses, and each logical block address references a physical location of a physical block on the storage device. For each group, the controller determines whether at least one logical block address references a physical location of a physical block that includes valid data. Responsive to the at least one logical block address referencing valid data, the controller stores a first value to a field of a bit-level indirection table. The bit-level indirection table includes a number of fields equal to a number of groups of sequential logical block addresses. Responsive none of the logical block addresses referencing valid data, the controller stores a second value to the field.

20 Claims, 5 Drawing Sheets

BIT-LEVEL INDIRECTION DEFRAGMENTATION

TECHNICAL FIELD

The disclosure relates to logical defragmentation of data on a storage device.

BACKGROUND

Defragmentation of a storage device generally refers to rewriting data written to the storage device such that the data is stored sequentially in the storage device. In essence, the defragmentation process results in the storage device having either one sequentially written physical section of data and one sequential physical section of free space where future writes may occur or multiple, smaller sequential sections of data interspersed with sequential sections of free space. Similarly, logical defragmentation of a storage device rewrites data in such a way that logical block addresses that reference physical locations of physical blocks in the storage device that include valid data are sequential. Logical defragmentation differs from physical defragmentation in that logical block addresses are typically grouped in ways that require some logical block addresses to be zero-filled, or padded, if those particular logical block addresses do not reference physical locations of physical blocks that include valid data and other logical block addresses within the same group do reference physical locations of physical blocks that include valid data. This padding process typically results in the consumption of previously unused space. In some instances, such as full-volume random writes, the storage device may be filled prematurely with padded data, leading to severely compromised performance.

SUMMARY

In one example, the disclosure is directed to a method that may include grouping, by a controller of a storage device, sequential logical block addresses of a logical span from a plurality of logical spans of the storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device. Further, for each group of sequential logical block addresses from the plurality of groups of sequential logical block addresses, the method may include determining, by the controller, whether at least one logical block address of the group of sequential logical block addresses references a physical location of a physical block that includes valid data. Responsive to determining that the at least one logical block address of the group of sequential logical block addresses references the physical location of the physical block that includes valid data, the method may include storing, by the controller, a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span. Responsive to determining that none of the logical block addresses of the group of sequential logical block addresses reference the physical location of the physical block that includes valid data, the method may include storing, by the controller, a second value to the field of the bit-level indirection table to indicate that none of the logical block addresses of the group of sequential logical block addresses reference the physical location of the physical block that includes valid data.

In another example, the disclosure is directed to a storage device comprising at least one storage medium and a controller. The controller may be configured to group sequential logical block addresses of a logical span from a plurality of logical spans of the storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device. For each group of sequential logical block addresses from the plurality of groups of sequential logical block addresses, the controller may be configured to determine whether at least one logical block address of the group of sequential logical block addresses references a physical location of a physical block that includes valid data. Responsive to determining that the at least one logical block address of the group of sequential logical block addresses references the physical location of the physical block that includes valid data, the controller may be configured to store a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span. Responsive to determining that none of the logical block addresses of the group of sequential logical block addresses reference the physical location of the physical block that includes valid data, the controller may be configured to store a second value to the field of the bit-level indirection table to indicate that none of the logical block addresses of the group of sequential logical block addresses reference the physical location of the physical block that includes valid data.

In another example, the disclosure is directed to a device that may include means for grouping sequential logical block addresses of a logical span from a plurality of logical spans of a storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device. For each group of sequential logical block addresses from the plurality of groups of sequential logical block addresses, the device may include means for determining whether at least one logical block address of the group of sequential logical block addresses references a physical location of a physical block that includes valid data. Responsive to determining that the at least one logical block address of the group of sequential logical block addresses references the physical location of the physical block that includes valid data, the device may include means for storing a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span. Responsive to determining that none of the logical block addresses of the group of sequential logical block addresses reference the physical location of the physical block that includes valid data, the device may include means for storing a second value to the field of the bit-level indirection table to indicate that none of the logical block addresses of the group of sequential logical block addresses reference the physical location of the physical block that includes valid data.

The details of one or more examples of the disclosure are set forth in the accompanying drawings and the description below. Other features, objects, and advantages of the disclosure will be apparent from the description and drawings, and from the claims.

DETAILED DESCRIPTION

In general, techniques are described for logically defragmenting a storage device without zero-padding all non-valid data. For instance, for a logical defragmentation of a shingled magnetic recording (SMR) drive, instead of zero-padding all non-valid data, a controller of the SMR drive utilizing the techniques of this disclosure may pad non-valid data at some granularity less than the entire logical span (16 k, 32 k, etc.), and only for groups of logical block addresses that contain at least one logical address that references a physical location of a physical block that contains valid data, referred to herein as "padded groups." The controller may then sequentially write only the padded groups rather than the entire logical span. Controller 8 may track these padded groups using a lookup enhanced bit-field indirection table. In utilizing the techniques described herein, a controller may increase the efficiency and performance quality in logically limited environments. For instance, a hard disk drive (HDD) may be very resource constrained for indirection usage, especially for very large drives. In this way, techniques of this disclosure may enable a controller to better ration these constrained resources during logical defragmentation. Further, by creating the bit-field indirection table, controller 8 may efficiently track the padded groups within the logical span, as the granularity of the smaller padded groups increases the general difficulty of coordinating the defragmenting of the padded groups.

Figure 1:
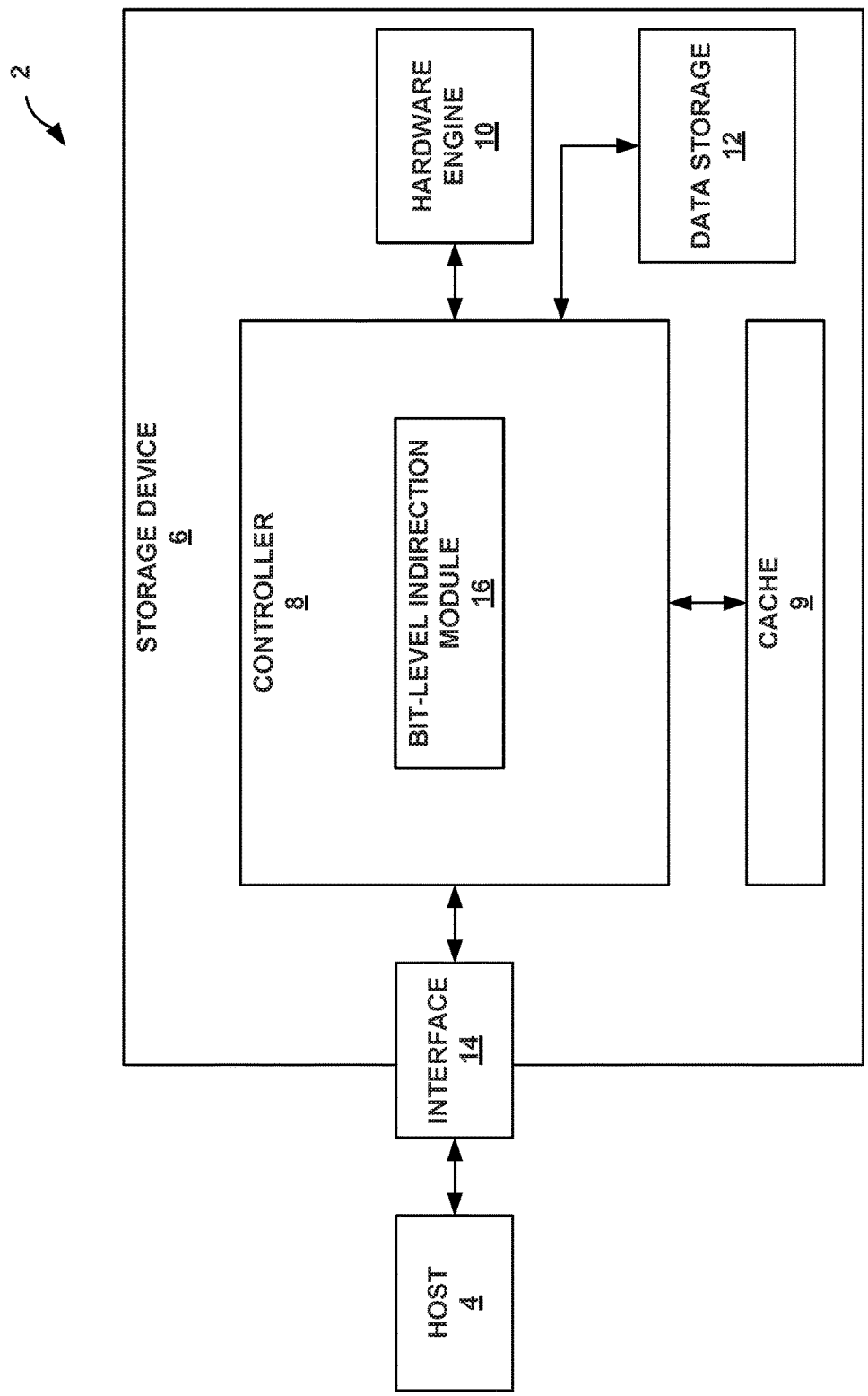
FIG. 1 is a conceptual and schematic block diagram illustrating an example storage environment in which a storage device is configured to performed packed logical defragmentation, in accordance with one or more techniques of this disclosure.

FIG. 1 is a conceptual and schematic block diagram illustrating an example storage environment 2 in which storage device 6 is configured to performed packed logical defragmentation, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, that may operate as a storage array. For instance, storage environment 2 may include a plurality of hard drives 6 configured as a redundant array of inexpensive/independent disks (RAID) that collectively function as a mass storage device for host device 4. While techniques of this disclosure generally refer to storage environment 2 and storage device 6, techniques described herein may be performed in any storage environment that utilizes tracks of data.

Storage environment 2 may include host device 4 which may store data to and/or retrieve data from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, tablet computers, televisions, cameras, display devices, digital media players, video gaming consoles, video streaming device, and the like. Typically, host device 4 comprises any device having a processing unit. The term "processing unit" may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like.

As illustrated in FIG. 1 storage device 6 may include controller 8, cache 9, hardware engine 10, data storage device 12, and interface 14. In some examples. storage device 6 may include additional components not shown in FIG. 1 for ease of illustration purposes. For example, storage device 6 may include power delivery components, including, for example, a capacitor, super capacitor, or battery, a printed board (PB) to which components of storage device 6 are mechanically attached and which includes electrically conductive traces that electrically interconnect components of storage device 6, and the like. In some examples, the physical dimensions and connector configurations of storage device 6 may conform to one or more standard form factors. Some example standard form factors include, but are not limited to, 3.5" hard disk drive (HDD), 2.5" HDD, or 1.8" HDD.

In some examples, cache 9 may store information for processing during operation of storage device 6. In some examples, cache 9 is a temporary memory, meaning that a primary purpose of cache 9 is not long-term storage. Cache 9 of storage device 6 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

In some examples, storage device 6 may be a shingled magnetic recording (SMR) hard drive. With SMR, relatively wide tracks are written to storage device 6 and successively written data tracks partially overlap the previously written data tracks. This increases the density of storage device 6 by packing the tracks closer together. When energized, a magnetic field emanating from the poles writes and erases data by flipping the magnetization of small regions, called bits, on spinning platters, such as data storage 12, directly below the poles. SMR hard drives may enable high data densities and are particularly suited for continuous writing/erasing.

Data storage 12 may be configured to store larger amounts of information than cache 9. Data storage 12 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Data storage 12 may be one or more magnetic platters in storage device 6, each platter containing one or more regions of one or more tracks of data.

In examples where storage device 6 is an SMR hard drive, data storage 12 portion of storage device 6 may comprise two types of regions: a regular shingled region (herein referred to as "I-regions") and "exception regions" (herein referred to as "E-regions"). I-regions include tracks on a disk surface organized into a plurality of shingled regions. The direction of the shingled writing for an I-region can be from an inner diameter (ID) to an outer diameter (OD) or from OD to ID. The disk may also be shingled in both directions on the same surface, with the two zones meeting approximately at the mid-diameter point. The write performance of storage device 6 correlates with the number of tracks grouped together in each region such that, as the number of tracks increases, the write performance of hard disk 6 may decrease when the writes are random or smaller than the size of the grouped tracks. Once written in the shingled structure, an individual track may not be able to be updated in place because re-writing the track in place may overwrite and destroy the data in the overlapping tracks.

A portion of the magnetic media may be allocated to E-regions to improve the performance of SMR drives. E-regions may be used as staging areas for data which will ultimately be written to an I-region. The E-region is sometimes referred to as an E-cache. Because most of the data in an SMR drive is expected to be stored sequentially in I-regions, the data records that are not currently stored in the I-regions can be thought of as "exceptions" to sequential I-region storage. Storage device 6 may store such exceptions in the E-regions.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express (PCIe). The electrical connection of interface 14 (e.g., the data bus, the control bus, or both) is connected to controller 8, providing an electrical connection between host device 4 and controller 8, enabling data to be exchanged between host device 4 and controller 8. In some examples, the electrical connection of interface 14 may also permit storage device 6 to receive power from host device 4.

In the example of FIG. 1, storage device 6 includes hardware engine 10, which may represent the hardware responsible for interfacing with the storage medium. Hardware engine 10 may, in the context of a platter-based hard drive, represent the magnetic read/write head and the accompanying hardware to configure, drive and process the signals sensed by the magnetic read/write head.

Storage device 6 includes controller 8, which may manage one or more operations of storage device 6. Controller 8 may interface with host device 4 via interface 14 and manage the storage of data to and the retrieval of data from data storage 12 accessible via hardware engine 10. Controller 8 may, as one example, manage writes to and reads from the memory devices, e.g., Negated AND (NAND) flash memory chips or a hard disk drive platter. In some examples, controller 8 may be a hardware controller. In other examples, controller 8 may be implemented into storage device 6 as a software controller. Controller 8 may further include one or more features that may perform techniques of this disclosure, such as bit-level indirection module 16.

Host 4 may, in this respect, interface with various hardware engines, such as hardware engine 10, to interact with various sensors. Host 4 may execute software, such as the above noted operating system, to manage interactions between host 4 and hardware engine 10. The operating system may perform arbitration in the context of multi-core CPUs, where each core effectively represents a different CPU, to determine which of the CPUs may access hardware engine 10. The operating system may also perform queue management within the context of a single CPU to address how various events, such as read and write requests in the example of storage device 6, issued by host 4 should be processed by hardware engine 10 of storage device 6.

Controller 8 may include various modules, such as bit-level indirection module 16. Bit-level indirection module 16 of controller 8 may be configured to perform various techniques of this disclosure, including the technique described below with respect to FIG. 1. Bit-level indirection module 16 may perform operations described herein using software, hardware, firmware, or a mixture of both hardware, software, and firmware residing in and/or executing on storage device 6.

In accordance with techniques of this disclosure, bit-level indirection module 16 of controller 8 may group sequential logical block addresses of a logical span from a plurality of logical spans of data storage 12 into a plurality of groups of sequential logical block addresses. Each group of sequential logical block addresses from the plurality of groups of sequential logical block addresses includes a same number of logical block addresses, and each logical block address from each group of sequential logical block addresses references a physical location of a physical block on the storage device. For instance, a logical span may include 64 logical block addresses. Bit-level indirection module 16 may group the logical block addresses into eight different groups of eight logical block addresses per group. For ease of illustration, the eight different groups may be referenced as groups one through eight.

For each group of sequential logical block addresses from the plurality of groups of sequential logical block addresses, bit-level indirection module 16 may determine whether at least one logical block address of the group of sequential logical block addresses references a physical location of a physical block that includes valid data. In the example of FIG. 1, bit-level indirection module 16 may determine that groups one, two, five, seven, and eight contain at least one logical block address each that reference a physical location of a physical block that contains valid data. Conversely, bit-level indirection module 16 may determine that groups three, four, and six contain no logical block addresses that reference a physical location of a physical block that contains valid data.

Responsive to determining that the at least one logical block address of the group of sequential logical block addresses references the physical location of the physical block that includes valid data, bit-level indirection module 16 may store a first value in a field of a bit-level indirection table to indicate that the at least one logical block address of the group of sequential logical block addresses references the physical location of the physical block. The bit-level indirection table may include a number of fields equal to a number of groups of sequential logical block addresses in the plurality of groups of sequential logical block addresses for the logical span. In instances where bit-level indirection module 16 determines that groups one, two, five, seven, and eight contain at least one logical block address each that reference a physical location of a physical block that contains valid data, bit-level indirection module 16 may store the first value into corresponding fields of the bit-level indirection table indicating that the groups reference at least one block that includes valid data. For instance, bit-level indirection module 16 may store the value of one into the first, second, fifth, seventh, and eighth fields of the bit-level indirection table.

Conversely, responsive to determining that none of the logical block addresses of the group of sequential logical block addresses reference the physical location of the physical block that includes valid data, bit-level indirection module 16 may store a second value, different from the first value, in the field of the bit-level indirection table to indicate that none of the logical block addresses of the group of sequential logical block addresses reference the physical location of the physical block that includes valid data. In examples where bit-level indirection module 16 determines that groups three, four, and six contain no logical block addresses that reference a physical location of a physical block that contains valid data, bit-level indirection module 16 may store the second value into corresponding fields of the bit-level indirection table. For instance, bit-level indirection module 16 may store the value of zero in the third, fourth, and sixth fields of the bit-level indirection table. An example resulting bit-level indication table is shown in Table 1.

TABLE 1

| 1 | 1 | 0 | 0 |
| 1 | 0 | 1 | 1 |

Controller 8 may reference the created bit-level indirection table when defragmenting the logical span associated with the bit-level indirection table. For instance, rather than padding the entirety of the logical span with zeros for logical block addresses that do not reference a physical location of a physical block that contains valid data, controller 8 may only pad each of the groups that contain a logical block address that references a physical location of a physical block that contains valid data. Controller 8 may pad such groups by inserting zeros into the physical blocks that do not contain valid data referenced by the logical block addresses in the same group. By zero-padding data on a group level rather than on a logical span level, controller 8 may save physical space within data storage 12 by padding less data than controller 8 would pad using other defragmenting techniques. These techniques may also greatly increase drive performance in logically limited environments, such as an HDD, which may be resource constrained for very large drives.

Figure 2:
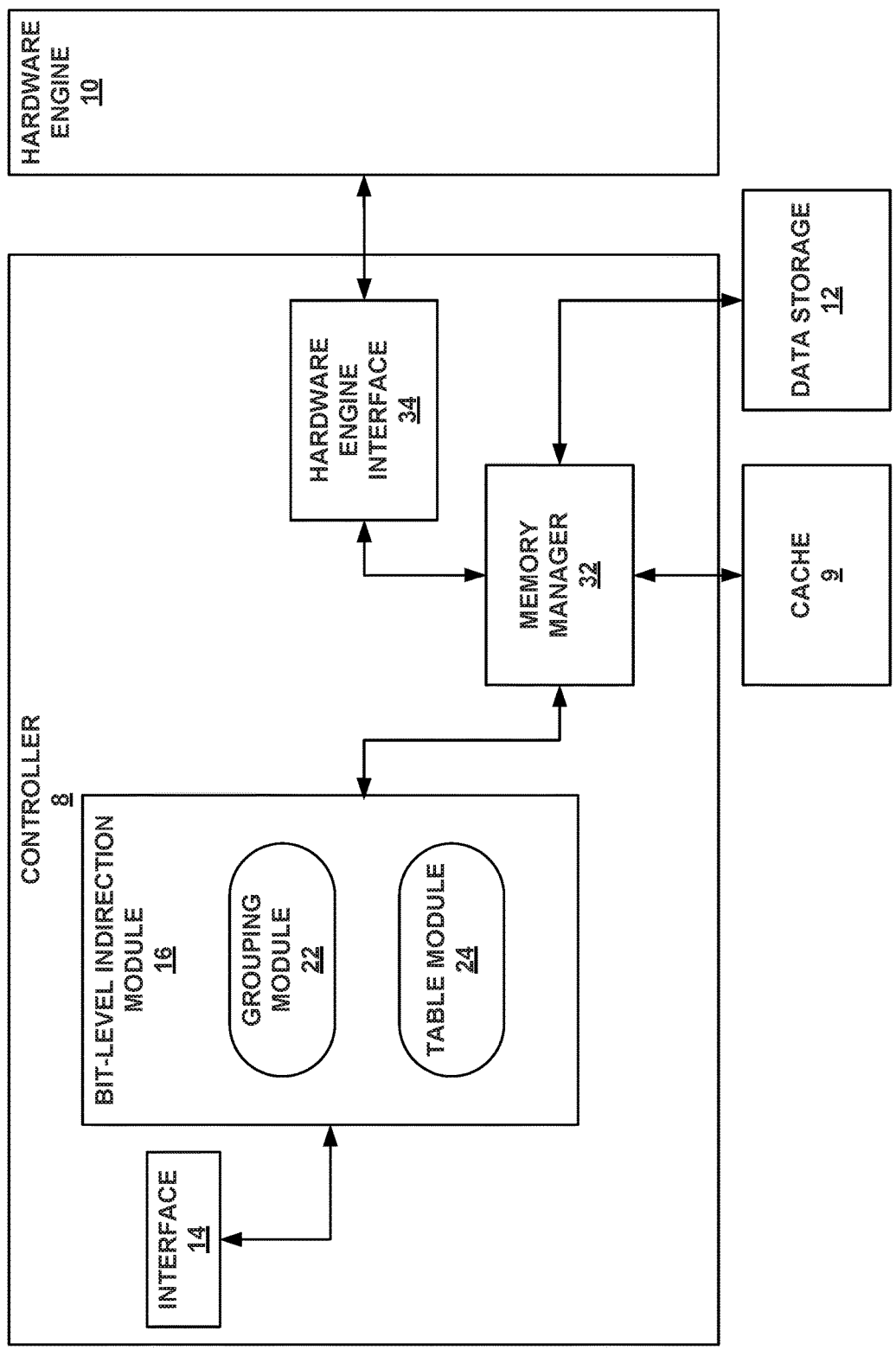
FIG. 2 is a block diagram illustrating the controller and other components of the storage device of FIG. 1 in more detail.

FIG. 2 is a block diagram illustrating controller 8 of FIG. 1 in more detail. In the example of FIG. 2, controller 8 includes interface 14, bit-level indirection module 16, memory manager unit 32, and hardware engine interface unit 34. Memory manager unit 32 and hardware engine interface unit 34 may perform various functions typical of a controller on a hard drive. For instance, hardware engine interface unit 34 may represent a unit configured to facilitate communications between the hardware controller 8 and the hardware engine 10. Hardware engine interface unit 34 may present a standardized or uniform way by which to interface with hardware engine 10. Hardware engine interface 34 may provide various configuration data and events to hardware engine 10, which may then process the event in accordance with the configuration data, returning various different types of information depending on the event. In the context of an event requesting that data be read (e.g., a read request), hardware engine 10 may return the data to hardware engine interface 34, which may pass the data to memory manager unit 32. Memory manager unit 32 may store the read data to cache 9 and return a pointer or other indication of where this read data is stored to hardware engine interface 34. In the context of an event involving a request to write data (e.g. a write request), hardware engine 10 may return an indication that the write has completed to hardware engine interface unit 34. In this respect, hardware engine interface unit 34 may provide a protocol and handshake mechanism with which to interface with hardware engine 10.

Bit-level indirection module 16 includes various modules, including grouping module 22 and table module 24. The various modules of bit-level indirection module 16 may be configured to perform various techniques of this disclosure, including the technique described above with respect to FIG. 1. Grouping module 22 and table module 24 may perform operations described herein using software, hardware, firmware, or a mixture of both hardware, software, and firmware residing in and/or executing on storage device 6.

In accordance with techniques of this disclosure, grouping module 22 of controller 8 may group sequential logical block addresses of a logical span from a plurality of logical spans of data storage 12 into a plurality of groups of sequential logical block addresses. Each group of sequential logical block addresses from the plurality of groups of sequential logical block addresses includes a same number of logical block addresses, and each logical block address from each group of sequential logical block addresses references a physical location of a physical block on the storage device. For instance, a logical span may include 32 logical block addresses. Bit-level indirection module 16 may group the logical block addresses into eight different groups of four logical block addresses per group. In some examples, each group of sequential logical block addresses may reference a group of physical blocks that make up one of 16 k, 32 k, 64 k, 128, or 256 k bytes of storage. For ease of illustration, the eight different groups may be referenced as groups one through eight.

For each group of sequential logical block addresses from the plurality of groups of sequential logical block addresses, table module 24 may determine whether at least one logical block address of the group of sequential logical block addresses references a physical location of a physical block that includes valid data. In the example of FIG. 2, table module 24 may determine that groups one, three, and eight contain at least one logical block address each that reference a physical location of a physical block that contains valid data. Conversely, table module 24 may determine that groups two, four, five, six, and seven contain no logical block addresses that reference a physical location of a physical block that contains valid data.

For a group of sequential logical block addresses with at least one logical block address that references the physical location of the physical block that includes valid data and at least one logical block address references the physical location of the physical block that includes either invalid data or no data, table module 24 may pad the logical block addresses that reference invalid data or no data. In some examples, padding the data may mean that table module 24 utilizes controller 8 to store valid data in the physical location of the physical block referenced by each of the at least one logical block address that includes either invalid data or no data. The valid data may simply be a null value, or some other low-density data.

Responsive to determining that the at least one logical block address of the group of sequential logical block addresses references the physical location of the physical block that includes valid data, table module 24 may store a first value in a field of a bit-level indirection table to indicate that the at least one logical block address of the group of sequential logical block addresses references the physical location of the physical block. The bit-level indirection table may include a number of fields equal to a number of groups of sequential logical block addresses in the plurality of groups of sequential logical block addresses for the logical span. In instances where table module 24 determines that groups one, three, and eight contain at least one logical block address each that reference a physical location of a physical block that contains valid data, table module 24 may store the first value into corresponding fields of the bit-level indirection table indicating that the groups reference at least one block that includes valid data. For instance, table module 24 may store the value of one into the first, third, and eighth fields of the bit-level indirection table.

Conversely, responsive to determining that none of the logical block addresses of the group of sequential logical block addresses reference the physical location of the physical block that includes valid data, table module 24 may store a second value, different from the first value, in the field of the bit-level indirection table to indicate that none of the logical block addresses of the group of sequential logical block addresses reference the physical location of the physical block that includes valid data. In examples where table module 24 determines that groups two, four, five, six, and seven contain no logical block addresses that reference a physical location of a physical block that contains valid data, table module 24 may store the second value into corresponding fields of the bit-level indirection table. For instance, table module 24 may store the value of zero in the second, fourth, fifth, sixth, and seventh fields of the bit-level indirection table. An example resulting bit-level indication table is shown in Table 2.

TABLE 2

| 1 | 0 | 1 | 0 |
|---|---|---|---|
| 0 | 0 | 0 | 1 |

Controller 8 may utilize the resulting bit-level indication as a key when defragmenting storage device 6. For instance, based at least in part on the bit-level indirection table, table module 24 may determine a logical block address that references the physical location of the physical block that includes valid data. In doing so, table module 24 may select a group that includes a logical block address that references the physical location of the physical block that includes valid data. In the example of FIG. 2, table module 24 may select group three. Using the third group of logical block addresses, table module 24 may determine which logical block addresses in the third group reference a respective physical location of a respective block that includes valid data, and which logical block addresses are padded.

Similarly, controller 8 may determine a total number of logical block addresses of the logical span that reference a respective physical location of a respective physical block that includes valid data. For example, in the example of FIG. 2, controller 8 may repeat the process described above with respect to group three on groups one and eight. In other words, using the first group of logical block addresses and the eighth group of logical block addresses, table module 24 may determine which logical block addresses in the first group and the eighth group reference a respective physical location of a respective block that includes valid data, and which logical block addresses are padded. Table module 24 may further count the number of logical block addresses of the logical span that reference a respective physical location of a respective physical block that includes valid data. This count may be utilized by controller 8 during defragmentation of the physical space of data storage 12.

In some examples, controller 8 may defragment data storage 12 based at least in part on the bit-level indirection table. The defragmentation may be either a logical defragmentation or a physical defragmentation. For instance, for a logical defragmentation, controller 8 may read the bit-level indirection table to determine which groups of logical block addresses reference physical locations of physical blocks that include valid data. In the example of FIG. 2, these groups include groups one, three, and eight. Controller 8 may write each of the groups of sequential logical block addresses from the plurality of groups of sequential logical block addresses where at least one logical block address of the group of sequential logical block addresses references the physical location of the physical block that includes valid data sequentially in the logical span. In other words, controller 8 may rewrite the logical span such that groups one, three, and eight are in sequential order (i.e., group one stays in the same location, group three is rewritten to the location of group two, and group eight is rewritten to the location of group three).

In other examples, when controller 8 is physically defragmenting data storage 12, controller 8 may access the valid data in each of the physical locations referenced by each of the logical block addresses in each of the groups of sequential logical block addresses where at least one logical block address of the group of sequential logical block addresses references the physical location of the physical block that includes valid data. Controller 8 may then rewrite this accessed data sequentially in the physical space of data storage 12.

In some examples, data storage 12 may include a plurality of logical spans. In such examples, each logical span of the plurality of logical spans may be associated with a respective bit-level indirection table. In other words, the number of logical spans in data storage 12 may be equal to the number of bit-level indirection tables, and each bit-level indirection table may be defined based on the associated logical span. In such examples, table module 24 may create and store an accumulation table in data storage 12.

Each entry of the accumulation table equals a sum of respective values for each respective field in a respective bit-level indirection table and the preceding entry in the accumulation table. For instance, data storage 12 may include four logical spans. The first logical span may define a bit-level indirection table as shown in Table 2. The second logical span may be associated with the bit-level indirection table of Table 3 below:

TABLE 3

| 1 | 1 | 1 | 1 |
|---|---|---|---|
| 0 | 1 | 0 | 0 |

The third logical span may be associated with the bit-level indirection table of Table 4 below:

TABLE 4

| 0 | 1 | 0 | 1 |
|---|---|---|---|
| 0 | 1 | 0 | 1 |

The fourth logical span may be associated with the bit-level indirection table of Table 5 below:

TABLE 5

| 0 | 1 | 1 | 1 |
|---|---|---|---|
| 1 | 1 | 1 | 1 |

Given the four bit-level indirection tables above, table module 24 may create an accumulation table. Table module 24 may determine a number of groups of logical block addresses in the first logical span that include at least one logical block address that references a physical location of a physical block that includes valid data by summing the entries in the bit-level indirection table. Table module 24 may store that value (i.e., 3) as the first entry of the accumulation table.

Table module 24 may then determine a number of groups of logical block addresses in the second logical span that include at least one logical block address that references a physical location of a physical block that includes valid data by summing the entries in the bit-level indirection table. Table module 24 may store the sum of that value (i.e., 5) and the value stored in the preceding entry (i.e., 3) in the second entry of the accumulation table. In other words, table module 24 may store a value of 8 in the second entry of the accumulation table.

Table module 24 may then determine a number of groups of logical block addresses in the third logical span that include at least one logical block address that references a physical location of a physical block that includes valid data by summing the entries in the bit-level indirection table. Table module 24 may store the sum of that value (i.e., 4) and the value stored in the preceding entry (i.e., 8) in the third entry of the accumulation table. In other words, table module 24 may store a value of 12 in the third entry of the accumulation table.

Table module 24 may then determine a number of groups of logical block addresses in the fourth logical span that include at least one logical block address that references a physical location of a physical block that includes valid data by summing the entries in the bit-level indirection table. Table module 24 may store the sum of that value (i.e., 7) and the value stored in the preceding entry (i.e., 12) in the fourth entry of the accumulation table. In other words, table module 24 may store a value of 19 in the fourth entry of the accumulation table. The resulting accumulation table is represented below:

TABLE 6

| 3 |
|---|
| 8 |
| 12 |
| 19 |

Controller 8 may utilize the accumulation table when defragmenting the physical space of data storage 12. For instance, if controller 8 was to defragment the entirety of data storage 12, controller 8 may read the final entry in the accumulation table to determine the amount of physical space that will be contiguously written during defragmentation (i.e., the value in the final entry of the accumulation table multiplied by the size of the group of physical blocks referenced by each group of logical block addresses). In another instance, if controller 8 was to defragment only a portion of data storage 12, controller 8 may read a preceding entry of the accumulation table to determine the amount of physical space that will be contiguously written during defragmentation.

Figure 3:
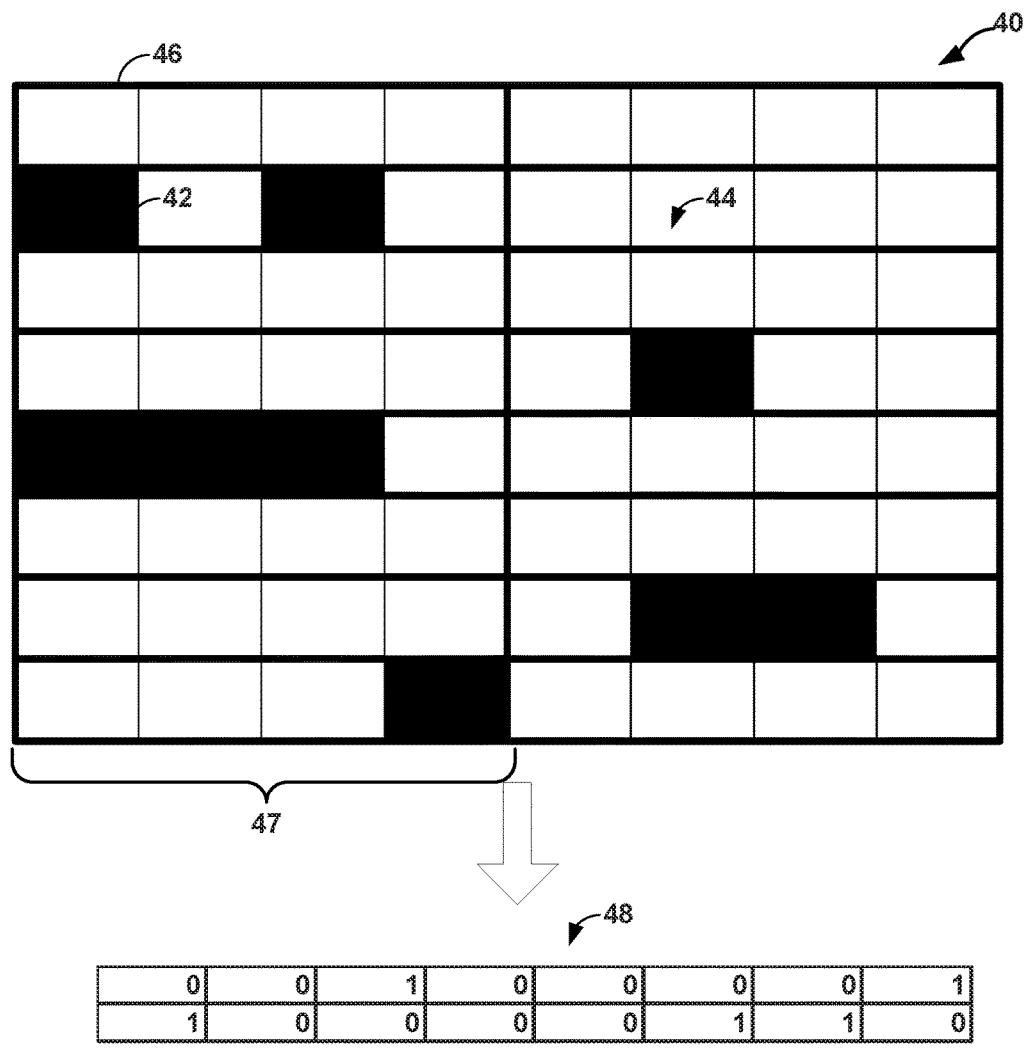
FIG. 3 is a conceptual table illustrating an example a logical span and a corresponding bit-level indirection table, in accordance with one or more techniques of this disclosure.

FIG. 3 is a conceptual table 40 illustrating an example logical span 46 and a corresponding bit-level indirection table 48, in accordance with one or more techniques of this disclosure. In the example of FIG. 3, logical span 46 includes sixty-four logical block addresses. Each group of logical block addresses, such as group 47, includes four logical block addresses, meaning that each logical span includes sixteen groups of four logical block addresses.

In the example of FIG. 3, logical block addresses (LBAs) that reference a physical location of a physical block that includes valid data are shown in solid black (i.e., LBA 42). Further, LBAs that reference a physical location of a physical block that includes invalid data or no data are empty are shown in white (i.e., LBA 44).

For each group of sequential logical block addresses in logical span 46, a controller may determine whether at least one logical block address of the group of sequential logical block addresses references a physical location of a physical block that includes valid data. In the example of FIG. 3, the controller may determine that groups three, eight, nine, fourteen, and fifteen contain at least one logical block address each that references a physical location of a physical block that contains valid data. Conversely, the controller may determine that groups one, two, four, five, six, seven, ten, eleven, twelve, thirteen, and sixteen contain no logical block addresses that reference a physical location of a physical block that contains valid data.

Responsive to determining that the at least one logical block address of the group of sequential logical block addresses references the physical location of the physical block that includes valid data, the controller may store a first value (e.g., a value of 1) in a field of bit-level indirection table 48 to indicate that the at least one logical block address of the group of sequential logical block addresses references the physical location of the physical block. In instances where controller 8 determines that groups three, eight, nine, fourteen, and fifteen contain at least one logical block address each that reference a physical location of a physical block that contains valid data, controller 8 may store a value of 1 into corresponding fields of bit-level indirection table 48 indicating that the groups reference at least one block that includes valid data. As shown in the example of FIG. 3, bit-level indirection table 48 associated with logical span 46 includes a value of 1 in the third, eighth, ninth, fourteenth, and fifteenth entries, indicating that the third, eighth, ninth, fourteenth, and fifteenth groups of logical block addresses include at least one logical block address that references a physical location of a physical block that includes valid data.

Conversely, responsive to determining that none of the logical block addresses of the group of sequential logical block addresses reference the physical location of the physical block that includes valid data, the controller may store a second value (e.g., a value of 0) in the field of the bit-level indirection table to indicate that none of the logical block addresses of the group of sequential logical block addresses reference the physical location of the physical block that includes valid data. In examples where controller 8 determines that groups one, two, four, five, six, seven, ten, eleven, twelve, thirteen, and sixteen contain no logical block addresses that reference a physical location of a physical block that contains valid data, controller 8 may store the value of 0 into corresponding fields of bit-level indirection table 48. As shown in the example of FIG. 3, bit-level indirection table 48 associated with logical span 46 includes a value of 0 in the first, second, fourth, fifth, sixth, seventh, tenth, eleventh, twelfth, thirteenth, and sixteenth entries, indicating that the first, second, fourth, fifth, sixth, seventh, tenth, eleventh, twelfth, thirteenth, and sixteenth groups of logical block addresses include no logical block addresses that reference a physical location of a physical block that includes valid data.

Figure 4:
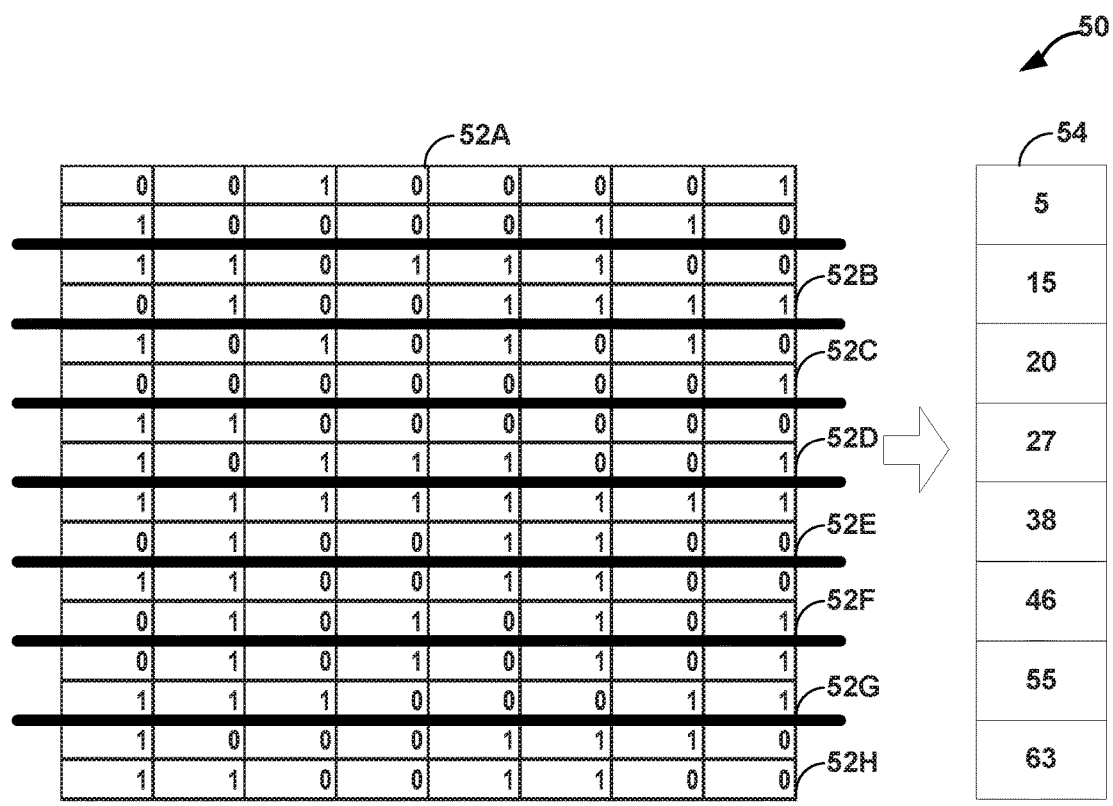
FIG. 4 is a conceptual table illustrating a series of bit-level indirection tables and a corresponding accumulation table, in accordance with one or more techniques of this disclosure.

FIG. 4 is a conceptual table 50 illustrating a series of bit-level indirection tables 52A-52H and a corresponding accumulation table 54, in accordance with one or more techniques of this disclosure. In some examples, the eight bit-level indirection tables 52A-52H of FIG. 4 may represent the entirety of a data storage portion of a storage device, such as data storage 12 in FIGS. 1 and 2, meaning that the data storage portion may only include a total of eight logical spans. In other examples, the eight bit-level indirection tables 52A-52H of FIG. 4 may represent a portion of a data storage portion of a storage device, meaning that the data storage portion may include more than eight logical spans. Each of bit-level indirection tables 52A-52H may include sixteen entries, where an entry has a value of 1 if a corresponding group of logical block addresses includes at least one logical block address that references a physical location of a physical block that includes valid data, and where an entry has a value of 0 if the corresponding group of logical block addresses includes no logical block addresses that reference a physical location of a physical block that includes valid data.

In examples where the data storage portion of the storage device includes a plurality of logical spans, the controller may create and store accumulation table 54 in the data storage portion. Each entry of accumulation table 54 may equal a sum of respective values for each respective field in a respective bit-level indirection table and the preceding entry in accumulation table 54. An example process for deriving accumulation table 54 is shown below.

Given the eight bit-level indirection tables 52A-52H of FIG. 4, a controller of the storage device may create accumulation table 54. The controller may determine a number of groups of logical block addresses in the first logical span that include at least one logical block address that references a physical location of a physical block that includes valid data by summing the entries in bit-level indirection table 52A. The controller may store that value (i.e., 5) as the first entry of accumulation table 54.

The controller may then determine a number of groups of logical block addresses in the second logical span that include at least one logical block address that references a physical location of a physical block that includes valid data by summing the entries in bit-level indirection table 52B. The controller may store the sum of that value (i.e., 10) and the value stored in the preceding entry (i.e., 5) in the second entry of accumulation table 54. In other words, the controller may store a value of 15 in the second entry of accumulation table 54.

The controller may then determine a number of groups of logical block addresses in the third logical span that include at least one logical block address that references a physical location of a physical block that includes valid data by summing the entries in bit-level indirection table 52C. The controller may store the sum of that value (i.e., 5) and the value stored in the preceding entry (i.e., 15) in the third entry of accumulation table 54. In other words, the controller may store a value of 20 in the third entry of accumulation table 54.

The controller may then determine a number of groups of logical block addresses in the fourth logical span that include at least one logical block address that references a physical location of a physical block that includes valid data by summing the entries in bit-level indirection table 52D. The controller may store the sum of that value (i.e., 7) and the value stored in the preceding entry (i.e., 20) in the fourth entry of accumulation table 54. In other words, the controller may store a value of 27 in the fourth entry of accumulation table 54.

The controller may then determine a number of groups of logical block addresses in the fifth logical span that include at least one logical block address that references a physical location of a physical block that includes valid data by summing the entries in bit-level indirection table 52E. The controller may store the sum of that value (i.e., 11) and the value stored in the preceding entry (i.e., 27) in the fifth entry of accumulation table 54. In other words, the controller may store a value of 38 in the fifth entry of accumulation table 54.

The controller may then determine a number of groups of logical block addresses in the sixth logical span that include at least one logical block address that references a physical location of a physical block that includes valid data by summing the entries in bit-level indirection table 52F. The controller may store the sum of that value (i.e., 8) and the value stored in the preceding entry (i.e., 38) in the sixth entry of accumulation table 54. In other words, the controller may store a value of 46 in the sixth entry of accumulation table 54.

The controller may then determine a number of groups of logical block addresses in the seventh logical span that include at least one logical block address that references a physical location of a physical block that includes valid data by summing the entries in bit-level indirection table 52G. The controller may store the sum of that value (i.e., 9) and the value stored in the preceding entry (i.e., 38) in the seventh entry of accumulation table 54. In other words, the controller may store a value of 55 in the seventh entry of accumulation table 54.

The controller may then determine a number of groups of logical block addresses in the eighth logical span that include at least one logical block address that references a physical location of a physical block that includes valid data by summing the entries in bit-level indirection table 52H. The controller may store the sum of that value (i.e., 8) and the value stored in the preceding entry (i.e., 55) in the eighth entry of accumulation table 54. In other words, the controller may store a value of 63 in the eighth entry of accumulation table 54.

The controller may utilize accumulation table 54 when defragmenting the physical space of a data storage portion of a storage device. For instance, if the controller was to defragment the entirety of the data storage portion, the controller may read the final entry in the accumulation table to determine the amount of physical space that will be contiguously written during defragmentation (i.e., the value in the final entry of accumulation table 54 multiplied by the size of the group of physical blocks referenced by each group of logical block addresses). In another instance, if the controller was to defragment only a portion of the data storage portion, the controller may read a preceding entry of accumulation table 54 to determine the amount of physical space that will be contiguously written during defragmentation.

Figure 5:
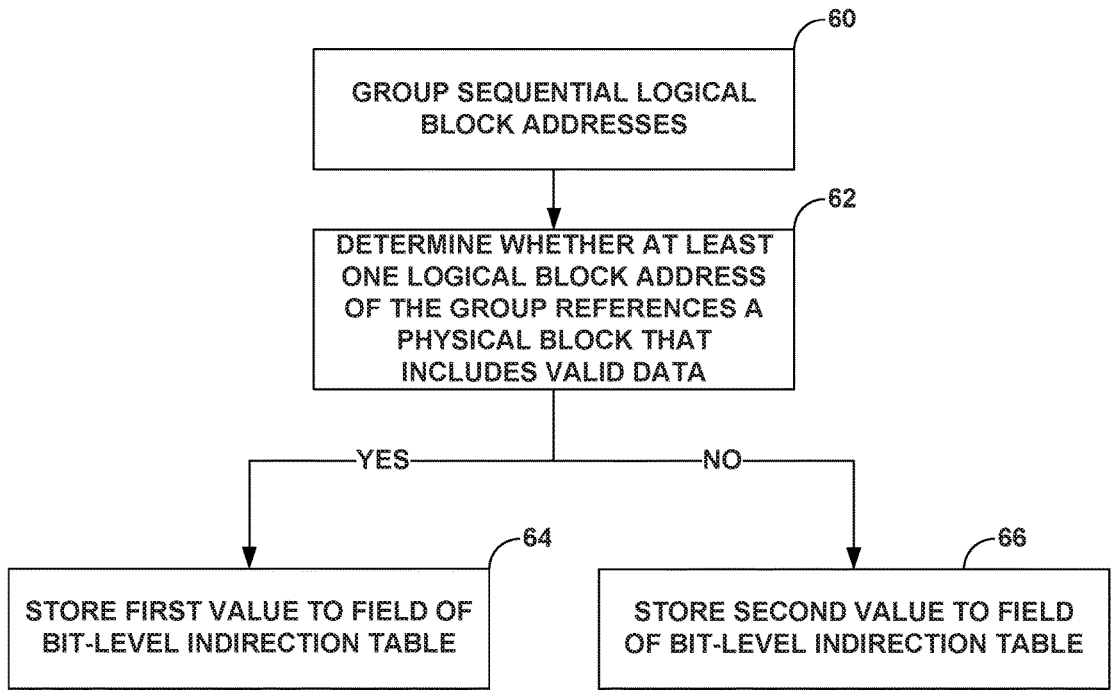
FIG. 5 is a flow diagram illustrating an exemplary operation of a storage device configured to perform packed logical defragmentation, in accordance with one or more techniques of this disclosure.

FIG. 5 is a flow diagram illustrating an exemplary operation of a storage device configured to perform packed logical defragmentation, in accordance with one or more techniques of this disclosure. For the purposes of illustration only, reference will be made to structures of FIG. 1 in describing the functionality performed in accordance with the techniques of this disclosure.

In accordance with techniques of this disclosure, controller 8 may group sequential logical block addresses of a logical span from a plurality of logical spans of data storage 12 into a plurality of groups of sequential logical block addresses (60). Each group of sequential logical block addresses from the plurality of groups of sequential logical block addresses includes a same number of logical block addresses, and each logical block address from each group of sequential logical block addresses references a physical location of a physical block on the storage device. For instance, a logical span may include 128 logical block addresses. Bit-level indirection module 16 may group the logical block addresses into eight different groups of sixteen logical block addresses per group. In some examples, each group of sequential logical block addresses may reference a group of physical blocks that make up one of 16 k, 32 k, 64 k, 128, or 256 k bytes of storage. For ease of illustration, the eight different groups may be referenced as groups one through eight.

For each group of sequential logical block addresses from the plurality of groups of sequential logical block addresses, controller 8 may determine whether at least one logical block address of the group of sequential logical block addresses references a physical location of a physical block that includes valid data (62). In the example of FIG. 2, controller 8 may determine that groups two, three, four, five, six, and eight contain at least one logical block address each that reference a physical location of a physical block that contains valid data. Conversely, controller 8 may determine that groups one and seven contain no logical block addresses that reference a physical location of a physical block that contains valid data.

For a group of sequential logical block addresses with at least one logical block address that references the physical location of the physical block that includes valid data and at least one logical block address references the physical location of the physical block that includes either invalid data or no data, controller 8 may pad the logical block addresses that reference invalid data or no data. In some examples, padding the data may mean that controller 8 stores valid data in the physical location of the physical block referenced by each of the at least one logical block address that includes either invalid data or no data. The valid data may simply be a null value, or some other low-density data.

Responsive to determining that the at least one logical block address of the group of sequential logical block addresses references the physical location of the physical block that includes valid data (YES branch of 62), controller 8 may store a first value in a field of a bit-level indirection table to indicate that the at least one logical block address of the group of sequential logical block addresses references the physical location of the physical block (64). The bit-level indirection table may include a number of fields equal to a number of groups of sequential logical block addresses in the plurality of groups of sequential logical block addresses for the logical span. In instances where controller 8 determines that groups two, three, four, five, six, and eight contain at least one logical block address each that reference a physical location of a physical block that contains valid data, controller 8 may store the first value into corresponding fields of the bit-level indirection table indicating that the groups reference at least one block that includes valid data. For instance, controller 8 may store the value of one into the second, third, fourth, fifth, sixth, and eighth fields of the bit-level indirection table.

Conversely, responsive to determining that none of the logical block addresses of the group of sequential logical block addresses reference the physical location of the physical block that includes valid data (NO branch of 62), controller 8 may store a second value, different than the first value to the field of the bit-level indirection table to indicate that none of the logical block addresses of the group of sequential logical block addresses reference the physical location of the physical block that includes valid data (66). In examples where controller 8 determines that groups one and seven contain no logical block addresses that reference a physical location of a physical block that contains valid data, controller 8 may store the second value into corresponding fields of the bit-level indirection table. For instance, controller 8 may store the value of zero into the first and seventh fields of the bit-level indirection table. An example resulting bit-level indication table is shown in Table 7.

TABLE 7

| 0 | 1 | 1 | 1 |
| 1 | 1 | 0 | 1 |

Controller 8 may utilize the resulting bit-level indication as a key when defragmenting storage device 6. For instance, based at least in part on the bit-level indirection table, controller 8 may determine a logical block address that references the physical location of the physical block that includes valid data. In doing so, controller 8 may select a group that includes a logical block address that references the physical location of the physical block that includes valid data. In the example of FIG. 5, controller 8 may select group three. Using the third group of logical block addresses, controller 8 may determine which logical block addresses in the third group reference a respective physical location of a respective block that includes valid data, and which logical block addresses are padded.

Similarly, controller 8 may determine a total number of logical block addresses of the logical span that reference a respective physical location of a respective physical block that includes valid data. For example, in the example of FIG. 5, controller 8 may repeat the process described above with respect to group three on groups two, four, five, six, and eight. In other words, using the second, fourth, fifth, sixth, and eighth groups of logical block addresses, controller 8 may determine which logical block addresses in the second, fourth, fifth, sixth, and eighth groups reference a respective physical location of a respective block that includes valid data, and which logical block addresses are padded. Controller 8 may further count the number of logical block addresses of the logical span that reference a respective physical location of a respective physical block that includes valid data. This count may be utilized by controller 8 during defragmentation of the physical space of data storage 12.

In some examples, controller 8 may defragment data storage 12 based at least in part on the bit-level indirection table. The defragmentation may be either a logical defragmentation or a physical defragmentation. For instance, in a logical defragmentation, controller 8 may read the bit-level indirection table to determine which groups of logical block addresses reference physical locations of physical blocks that include valid data. In the example of FIG. 5, these groups include groups two, three, four, five, six, and eight. Controller 8 may write each of the groups of sequential logical block addresses from the plurality of groups of sequential logical block addresses where at least one logical block address of the group of sequential logical block addresses references the physical location of the physical block that includes valid data sequentially in the logical span. In other words, controller 8 may rewrite the logical span such that groups two, three, four, five, six, and eight are in sequential order (i.e., group two is rewritten to the location of group one, group three is rewritten to the location of group two, etc.).

In other examples, when controller 8 is physically defragmenting data storage 12, controller 8 may access the valid data in each of the physical locations referenced by each of the logical block addresses in each of the groups of sequential logical block addresses where at least one logical block address of the group of sequential logical block addresses references the physical location of the physical block that includes valid data. Controller 8 may then rewrite this accessed data sequentially in the physical space of data storage 12.

In some examples, data storage 12 may include a plurality of logical spans. In such examples, each logical span of the plurality of logical spans may be associated with a respective bit-level indirection table. In other words, the number of logical spans in data storage 12 may be equal to the number of bit-level indirection tables, and each bit-level indirection table may be defined based on the associated logical span. In such examples, controller 8 may create and store an accumulation table in data storage 12. Each entry of the accumulation table equals a sum of respective values for each respective field in a respective bit-level indirection table and the preceding entry in the accumulation table.

Controller 8 may utilize the accumulation table when defragmenting the physical space of data storage 12. For instance, if controller 8 was to defragment the entirety of data storage 12, controller 8 may read the final entry in the accumulation table to determine the amount of physical space that will be contiguously written during defragmentation (i.e., the value in the final entry of the accumulation table multiplied by the size of the group of physical blocks referenced by each group of logical block addresses). In another instance, if controller 8 was to defragment only a portion of data storage 12, controller 8 may read a preceding entry of the accumulation table to determine the amount of physical space that will be contiguously written during defragmentation.

Controller 8 may reference the created bit-level indirection table when defragmenting the logical span associated with the bit-level indirection table. For instance, rather than padding the entirety of the logical span with zeros for logical block addresses that do not reference a physical location of a physical block that contains data, controller 8 may only pad each of the groups that contain a logical block address that references a physical location of a physical block that contains valid data by inserting zeros into the physical blocks that do not contain valid data referenced by the logical block addresses in the same group. By only zero-padding data on a group level, controller 8 may save physical space within data storage 12 by padding less data than controller 8 would pad when using other defragmenting techniques. These techniques may also greatly increase drive performance in logically limited environments. For instance, the techniques described herein may increase the performance of an HDD, which may be resource constrained in indirection usage, especially for very large drives.

Example 1

A method comprising: grouping, by a controller of a storage device, sequential logical block addresses of a logical span from a plurality of logical spans of the storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device; and for each group of sequential logical block addresses from the plurality of groups of sequential logical block addresses: determining, by the controller, whether at least one logical block address of the group of sequential logical block addresses references a physical location of a physical block that includes valid data; responsive to determining that the at least one logical block address of the group of sequential logical block addresses references the physical location of the physical block that includes valid data, storing, by the controller, a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span; and responsive to determining that none of the logical block addresses of the group of sequential logical block addresses reference the physical location of the physical block that includes valid data, storing, by the controller, a second value to the field of the bit-level indirection table to indicate that none of the logical block addresses of the group of sequential logical block addresses reference the physical location of the physical block that includes valid data.

Example 2

The method of example 1, wherein each respective logical span of the plurality of logical spans is associated with a respective bit-level indirection table.

Example 3

The method of any of examples 1 and 2, further comprising: storing, by the controller, an accumulation table, wherein the accumulation table has a number of entries equal to a number of bit-level indirection tables, and wherein each entry of the accumulation equals a sum of respective values for each respective field in a respective bit-level indirection table and the preceding entry in the accumulation table.

Example 4

The method of any of examples 1-3, wherein the first value is one, wherein the second value is zero, and wherein each field of the bit-level indirection table comprises a bit.

Example 5

The method of any of examples 1-4, wherein each group of sequential logical block addresses references a group of physical locations of a group of physical blocks comprising one of 16 k, 32 k, 64 k, 128 k, or 256 k bytes of storage.

Example 6

The method of any of examples 1-5, further comprising: determining, by the controller and based at least in part on the bit-level indirection table, a logical block address of the logical span that references the physical location of the physical block that includes valid data.

Example 7

The method of any of examples 1-6, further comprising: determining, by the controller and based at least in part on the bit-level indirection table, a number of logical block addresses of the logical span that reference a respective physical location of a respective physical block that includes valid data.

Example 8

The method of any of examples 1-7, further comprising: for a group of sequential logical block addresses with at least one logical block address that references the physical location of the physical block that includes valid data and at least one logical block address references the physical location of the physical block that includes either invalid data or no data, storing, by the controller, valid data in the physical location of the physical block referenced by each of the at least one logical block address that includes either invalid data or no data.

Example 9

The method of any of examples 1-8, further comprising: defragmenting, by the controller, the storage device based at least in part on the bit-level indirection table.

Example 10

The method of example 9, wherein defragmenting the storage device comprises: writing, by the controller, each of the groups of sequential logical block addresses from the plurality of groups of sequential logical block addresses where at least one logical block address of the group of sequential logical block addresses references the physical location of the physical block that includes valid data sequentially in the logical span.

Example 11

A storage device comprising: at least one storage medium; and a controller configured to: group sequential logical block addresses of a logical span from a plurality of logical spans of the storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device; and for each group of sequential logical block addresses from the plurality of groups of sequential logical block addresses: determine whether at least one logical block address of the group of sequential logical block addresses references a physical location of a physical block that includes valid data; responsive to determining that the at least one logical block address of the group of sequential logical block addresses references the physical location of the physical block that includes valid data, store a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span; and responsive to determining that none of the logical block addresses of the group of sequential logical block addresses reference the physical location of the physical block that includes valid data, store a second value to the field of the bit-level indirection table to indicate that none of the logical block addresses of the group of sequential logical block addresses reference the physical location of the physical block that includes valid data.

Example 12

The storage device of example 11, wherein each respective logical span of the plurality of logical spans is associated with a respective bit-level indirection table.

Example 13

The storage device of any of examples 11 or 12, wherein the controller is further configured to: store an accumulation table, wherein the accumulation table has a number of entries equal to a number of bit-level indirection tables, and wherein each entry of the accumulation equals a sum of respective values for each respective field in a respective bit-level indirection table and the preceding entry in the accumulation table.

Example 14

The storage device of any of examples 11-13, wherein the first value is one, wherein the second value is zero, and wherein each field of the bit-level indirection table comprises a bit.

Example 15

The storage device of any of examples 11-14, wherein each group of sequential logical block addresses references a group of physical locations of a group of physical blocks comprising one of 16 k, 32 k, 64 k, 128 k, or 256 k bytes of storage.

Example 16

The storage device of any of examples 11-15, wherein the controller is further configured to: determine, based at least in part on the bit-level indirection table, a logical block address of the logical span that references the physical location of the physical block that includes valid data.

Example 17

The storage device of any of examples 11-16, wherein the controller is further configured to: determine, based at least in part on the bit-level indirection table, a number of logical block addresses of the logical span that reference a respective physical location of a respective physical block that includes valid data.

Example 18

The storage device of any of examples 11-17, wherein the controller is further configured to: for a group of sequential logical block addresses with at least one logical block address that references the physical location of the physical block that includes valid data and at least one logical block address references the physical location of the physical block that includes either invalid data or no data, store valid data in the physical location of the physical block referenced by each of the at least one logical block address that includes either invalid data or no data.

Example 19

The storage device of any of examples 11-18, wherein the controller is further configured to: defragment the storage device based at least in part on the bit-level indirection table, wherein the controller being configured to defragment the storage device comprises the controller being configured to: write each of the groups of sequential logical block addresses from the plurality of groups of sequential logical block addresses where at least one logical block address of the group of sequential logical block addresses references the physical location of the physical block that includes valid data sequentially in the logical span.

Example 20

A device comprising: means for grouping sequential logical block addresses of a logical span from a plurality of logical spans of a storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device; and for each group of sequential logical block addresses from the plurality of groups of sequential logical block addresses: means for determining whether at least one logical block address of the group of sequential logical block addresses references a physical location of a physical block that includes valid data; responsive to determining that the at least one logical block address of the group of sequential logical block addresses references the physical location of the physical block that includes valid data, means for storing a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span; and responsive to determining that none of the logical block addresses of the group of sequential logical block addresses reference the physical location of the physical block that includes valid data, means for storing a second value to the field of the bit-level indirection table to indicate that none of the logical block addresses of the group of sequential logical block addresses reference the physical location of the physical block that includes valid data.

Example 21

A device comprising means for performing the method of any combination of examples 1-10.

Example 22

A computer-readable storage medium encoded with instructions that, when executed, cause at least one processor of a computing device to perform the method of any combination of examples 1-10.

Example 23

A device comprising at least one module operable by one or more processors to perform the method of any combination of examples 1-10.

The techniques described in this disclosure may be implemented, at least in part, in hardware, software, firmware, or any combination thereof. For example, various aspects of the described techniques may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processing units, or other processing units, to implement one or more of the techniques described herein, such as when instructions included or encoded in the computer-readable storage medium are executed by the one or more processing units. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
grouping, by a controller of a storage device, sequential logical block addresses of a logical span from a plurality of logical spans of the storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device; and
for each group of sequential logical block addresses from the plurality of groups of sequential logical block addresses:
  determining, by the controller, whether at least one logical block address of the group of sequential logical block addresses references a physical location of a physical block that includes valid data;
  responsive to determining that the at least one logical block address of the group of sequential logical block addresses references the physical location of the physical block that includes valid data, storing, by the controller, a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span; and
  responsive to determining that none of the logical block addresses of the group of sequential logical block addresses reference the physical location of the physical block that includes valid data, storing, by the controller, a second value to the field of the bit-level indirection table to indicate that none of the logical block addresses of the group of sequential logical block addresses reference the physical location of the physical block that includes valid data.

2. The method of claim 1, wherein each respective logical span of the plurality of logical spans is associated with a respective bit-level indirection table.

3. The method of claim 1, further comprising:
storing, by the controller, an accumulation table, wherein the accumulation table has a number of entries equal to a number of bit-level indirection tables, and wherein each entry of the accumulation equals a sum of respective values for each respective field in a respective bit-level indirection table and the preceding entry in the accumulation table.

4. The method of claim 1, wherein the first value is one, wherein the second value is zero, and wherein each field of the bit-level indirection table comprises a bit.

5. The method of claim 1, wherein each group of sequential logical block addresses references a group of physical locations of a group of physical blocks comprising one of 16 k, 32 k, 64 k, 128 k, or 256 k bytes of storage.

6. The method of claim 1, further comprising:
determining, by the controller and based at least in part on the bit-level indirection table, a logical block address of the logical span that references the physical location of the physical block that includes valid data.

7. The method of claim 1, further comprising:
determining, by the controller and based at least in part on the bit-level indirection table, a number of logical block addresses of the logical span that reference a respective physical location of a respective physical block that includes valid data.

8. The method of claim 1, further comprising:
for a group of sequential logical block addresses with at least one logical block address that references the physical location of the physical block that includes valid data and at least one logical block address references the physical location of the physical block that includes either invalid data or no data, storing, by the controller, valid data in the physical location of the physical block referenced by each of the at least one logical block address that includes either invalid data or no data.

9. The method of claim 1, further comprising:
defragmenting, by the controller, the storage device based at least in part on the bit-level indirection table.

10. The method of claim 9, wherein defragmenting the storage device comprises:
writing, by the controller, each of the groups of sequential logical block addresses from the plurality of groups of sequential logical block addresses where at least one logical block address of the group of sequential logical block addresses references the physical location of the physical block that includes valid data sequentially in the logical span.

11. A storage device comprising:
at least one storage medium; and
a controller configured to:
group sequential logical block addresses of a logical span from a plurality of logical spans of the storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device; and
for each group of sequential logical block addresses from the plurality of groups of sequential logical block addresses:
determine whether at least one logical block address of the group of sequential logical block addresses references a physical location of a physical block that includes valid data;
responsive to determining that the at least one logical block address of the group of sequential logical block addresses references the physical location of the physical block that includes valid data, store a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span; and
responsive to determining that none of the logical block addresses of the group of sequential logical block addresses reference the physical location of the physical block that includes valid data, store a second value to the field of the bit-level indirection table to indicate that none of the logical block addresses of the group of sequential logical block addresses reference the physical location of the physical block that includes valid data.

12. The storage device of claim 11, wherein each respective logical span of the plurality of logical spans is associated with a respective bit-level indirection table.

13. The storage device of claim 11, wherein the controller is further configured to:
store an accumulation table, wherein the accumulation table has a number of entries equal to a number of bit-level indirection tables, and wherein each entry of the accumulation equals a sum of respective values for each respective field in a respective bit-level indirection table and the preceding entry in the accumulation table.

14. The storage device of claim 11, wherein the first value is one, wherein the second value is zero, and wherein each field of the bit-level indirection table comprises a bit.

15. The storage device of claim 11, wherein each group of sequential logical block addresses references a group of physical locations of a group of physical blocks comprising one of 16 k, 32 k, 64 k, 128 k, or 256 k bytes of storage.

16. The storage device of claim 11, wherein the controller is further configured to:
determine, based at least in part on the bit-level indirection table, a logical block address of the logical span that references the physical location of the physical block that includes valid data.

17. The storage device of claim 11, wherein the controller is further configured to:
determine, based at least in part on the bit-level indirection table, a number of logical block addresses of the logical span that reference a respective physical location of a respective physical block that includes valid data.

18. The storage device of claim 11, wherein the controller is further configured to:
for a group of sequential logical block addresses with at least one logical block address that references the physical location of the physical block that includes valid data and at least one logical block address references the physical location of the physical block that includes either invalid data or no data, store valid data in the physical location of the physical block referenced by each of the at least one logical block address that includes either invalid data or no data.

19. The storage device of claim 11, wherein the controller is further configured to:
defragment the storage device based at least in part on the bit-level indirection table,
wherein the controller being configured to defragment the storage device comprises the controller being configured to:
write each of the groups of sequential logical block addresses from the plurality of groups of sequential logical block addresses where at least one logical block address of the group of sequential logical block addresses references the physical location of the physical block that includes valid data sequentially in the logical span.

20. A device comprising:
means for grouping sequential logical block addresses of a logical span from a plurality of logical spans of a storage device into a plurality of groups of sequential logical block addresses, wherein each group of sequential logical block addresses from the plurality of groups of sequential logical block addresses includes a same number of logical block addresses, and wherein each logical block address from each group of sequential logical block addresses references a physical location of a physical block on the storage device; and
for each group of sequential logical block addresses from the plurality of groups of sequential logical block addresses:
means for determining whether at least one logical block address of the group of sequential logical block addresses references a physical location of a physical block that includes valid data;
responsive to determining that the at least one logical block address of the group of sequential logical block addresses references the physical location of the physical block that includes valid data, means for storing a first value to a field of a bit-level indirection table to indicate that the at least one logical block address of the group of sequential logical block addresses references the physical location of the physical block, wherein the bit-level indirection table includes a number of fields equal to a number of groups of sequential logical block addresses in the plurality of groups of sequential logical block addresses for the logical span; and
responsive to determining that none of the logical block addresses of the group of sequential logical block addresses reference the physical location of the physical block that includes valid data, means for storing a second value to the field of the bit-level indirection table to indicate that none of the logical block addresses of the group of sequential logical block addresses reference the physical location of the physical block that includes valid data.

* * * * *